Dec. 29, 1925.  F. R. BEAR  1,567,483
CHALK LINE REEL
Filed Nov. 30, 1923
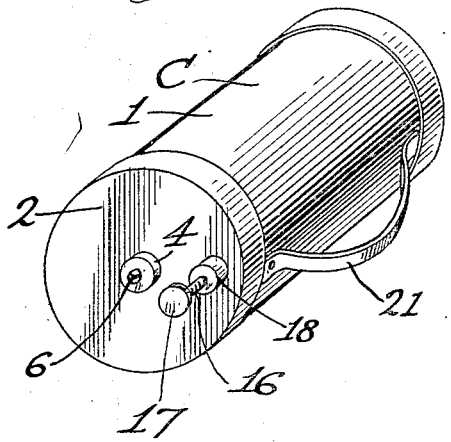
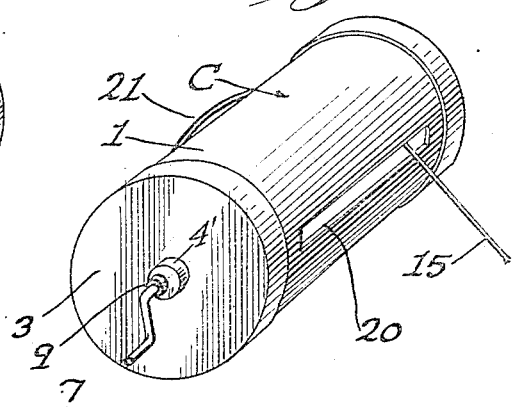
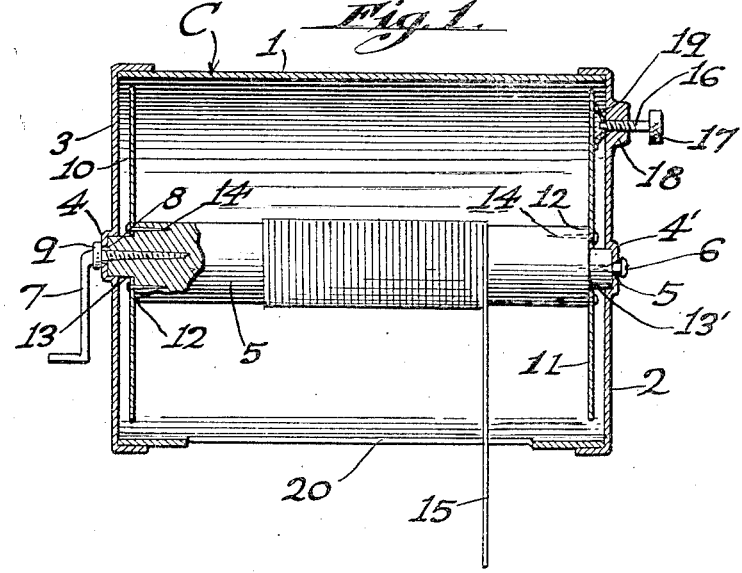
Inventor:
FRANCIS R. BEAR.
By Hazard and Miller
Attorneys
Witness:

Patented Dec. 29, 1925.

1,567,483

UNITED STATES PATENT OFFICE.

FRANCIS R. BEAR, OF REDLANDS, CALIFORNIA.

CHALK-LINE REEL.

Application filed November 30, 1923. Serial No. 677,800.

*To all whom it may concern:*

Be it known that I, FRANCIS R. BEAR, a citizen of the United States, residing at Redlands, in the county of San Bernardino and State of California, have invented new and useful Improvements in Chalk-Line Reels, of which the following is a specification.

My present invention being referred to as a chalk line reel, it may be understood that it is an object of this invention to provide convenient means for the protection and use of a chalk line, or the like, such as is commonly used by carpenters or others in the erection of buildings or in the laying out of work.

It is an object of this invention to provide a simple means for housing a chalk line, to protect soiling of the chalk line, or the distribution of chalk dust therefrom upon other objects in a tool box or other receptacle within which my chalk line may be carried, along with other tools or materials.

It is a further object of my invention to provide simple means whereby a chalk line may be conveniently handled without danger of entanglement and in such a manner as to permit of the ready use of a chalk line or the ready return of the same within a housing; and, in a preferred embodiment of my invention, I may provide a substantially cylindrical container with a longitudinal slot through which a line may be drawn and also with a handle which may be substantially opposite to said slot in a manner permitting the ready application of chalk to a line as the same is withdrawn.

It is a further object of this invention to provide a chalk line device with a reel of novel construction as hereinafter described, this reel preferably comprising a core element upon which the line may be wound and a pair of terminal discs secured adjacent the ends thereof in such manner as to permit the reduced ends of said core member to be employed as bearings therefor.

It is also an object of this invention to provide a chalk line reel of the general character described with suitable operating and control means, which may include a crank secured to one end of a reel and extending through one of a pair of end plates, the same or the opposite end plate being optionally provided with tensioning means such as are hereinafter described.

Other objects of my invention will appear from the following description of a preferred embodiment thereof, and from the appended claims, taken in connection with the accompanying drawings, in which:

Figure 1 is a vertical section through a chalk line reel of my improved design.

Figures 2 and 3 are, respectively, perspective views showing opposite ends and sides of the same or a similar reel.

Referring to the details of that specific embodiment of my invention which I have chosen for purposes of illustration. C may be an outer container, consisting essentially of a substantially cylindrical body 1, completed by a pair of end plates 2, 3, shown as fitting over the ends thereof and as respectively provided with substantially central depressions 4, 4', adapted to receive the reduced ends of a central reel element 5, to which one end of a chalk line, or the like, may be secured.

Each of the depressions 4, 4' may advantageously be provided with a substantially central circular aperture 5' adapted to receive retaining or operating means, such as the screw 6 and the crank 7, the latter being shown as provided with a thread, adapted to engage the central reel element 5, and as provided with a shoulder or shoulders such as are shown at 8 and 9, respectively adapted to engage the flat end of the reel element 5 and the outer surface of a boss or depression 4, 4' in one of the end plates 2, 3.

The reel proper of my device may be of comparatively simple construction, optionally consisting of the mentioned central element and a pair of terminal discs 10, 11, shown as secured to shoulders 12, adjacent the respective reduced sections 13, 13', of the mentioned central element, to which the said discs may be secured in any suitable way, as by means of the nails or screws 14.

In order to secure a suitable tension upon the chalk line 15, during the winding or unwinding of the same, or in order to lock the reel element proper at any desired point relative to the housing or cylindrical container therefrom, I may optionally provide such means as the screw 16, shown as provided with a milled head 17 and as extending through a threaded boss 18, in the end plate 2, the inner end of the screw 16 being shown as provided with a frictional braking engagement 19, adapted to bear against the terminal disc 11.

In order to permit of the withdrawal or return of a chalk line, I may provide the casing C with a suitable aperture, such as the slot 20, extending longitudinally of the curved surface of the cylindrical housing referred to; and I may optionally provide any suitable handle for the support of my novel chalk line reel in such manner as to permit the chalking of a line by means of a piece of chalk held in one hand while the line is being withdrawn therefrom. A strap handle such as is shown at 21, this handle being preferably placed substantially opposite the slot 20, is suitable for this purpose.

From the foregoing description it will be evident that I have provided a chalk line reel of comparatively simple and rugged construction which can be manufactured and sold at a moderate price and which is nevertheless capable of advantageous use not only for the specific purposes above referred to, but for the housing and control of other lines or cords intended for similar or dissimilar uses.

Although I have herein described but one complete embodiment of my invention, it will be understood that various features thereof might be independently employed, and also that various modifications might be made therein without departure from the spirit and scope of my invention, as the same is indicated above and in the following claims.

What I claim is:

1. A reel comprising a cylindrical body, end plates having flanges engaging said cylindrical body, there being depressions formed in said end plates, a spindle disposed within said body upon which a line may be wound, said spindle having reduced ends providing shoulders adjacent the ends of the spindle, the reduced ends being rotatable within said depressions, discs mounted upon the reduced ends and secured against said shoulders, a headed pin extending through one of the end plates into an end of the spindle, and a crank extending through the other end plate into the other end of the spindle, there being a slot formed longitudinally of said body through which the line may pass.

2. A reel comprising a cylindrical body, end plates having flanges engaging said cylindrical body, there being depressions formed in said end plates, a spindle disposed within said body upon which a line may be wound, said spindle having reduced ends providing shoulders adjacent the ends of the spindle, the reduced ends being rotatable within said depressions, discs mounted upon the reduced ends and secured against said shoulders, a headed pin extending through one of the end plates into an end of the spindle, a crank extending through the other end plate into the other end of the spindle, there being a slot formed longitudinally of said body through which the line may pass, a screw threaded into one of the end plates, and a brake shoe carried by said screw engageable upon one of said discs.

In testimony whereof I have signed my name to this specification.

FRANCIS R. BEAR.